Dec. 18, 1951  F. G. NICOLAUS  2,579,241
PERMUTATION AND COMBINATION MECHANISM
Filed June 27, 1947  8 Sheets-Sheet 1

Inventor.
Frank G. Nicolaus.
By
Attorney.

Dec. 18, 1951     F. G. NICOLAUS     2,579,241

PERMUTATION AND COMBINATION MECHANISM

Filed June 27, 1947     8 Sheets—Sheet 4

Inventor.
Frank G. Nicolaus
By Allard Livingston
Attorney.

Dec. 18, 1951   F. G. NICOLAUS   2,579,241
PERMUTATION AND COMBINATION MECHANISM
Filed June 27, 1947   8 Sheets-Sheet 5

Inventor.
Frank G. Nicolaus
By [signature]
Attorney.

Dec. 18, 1951   F. G. NICOLAUS   2,579,241
PERMUTATION AND COMBINATION MECHANISM
Filed June 27, 1947   8 Sheets-Sheet 6

Inventor
Frank G. Nicolaus.
By Albert Livingston
Attorney.

Dec. 18, 1951      F. G. NICOLAUS      2,579,241
PERMUTATION AND COMBINATION MECHANISM
Filed June 27, 1947      8 Sheets-Sheet 7
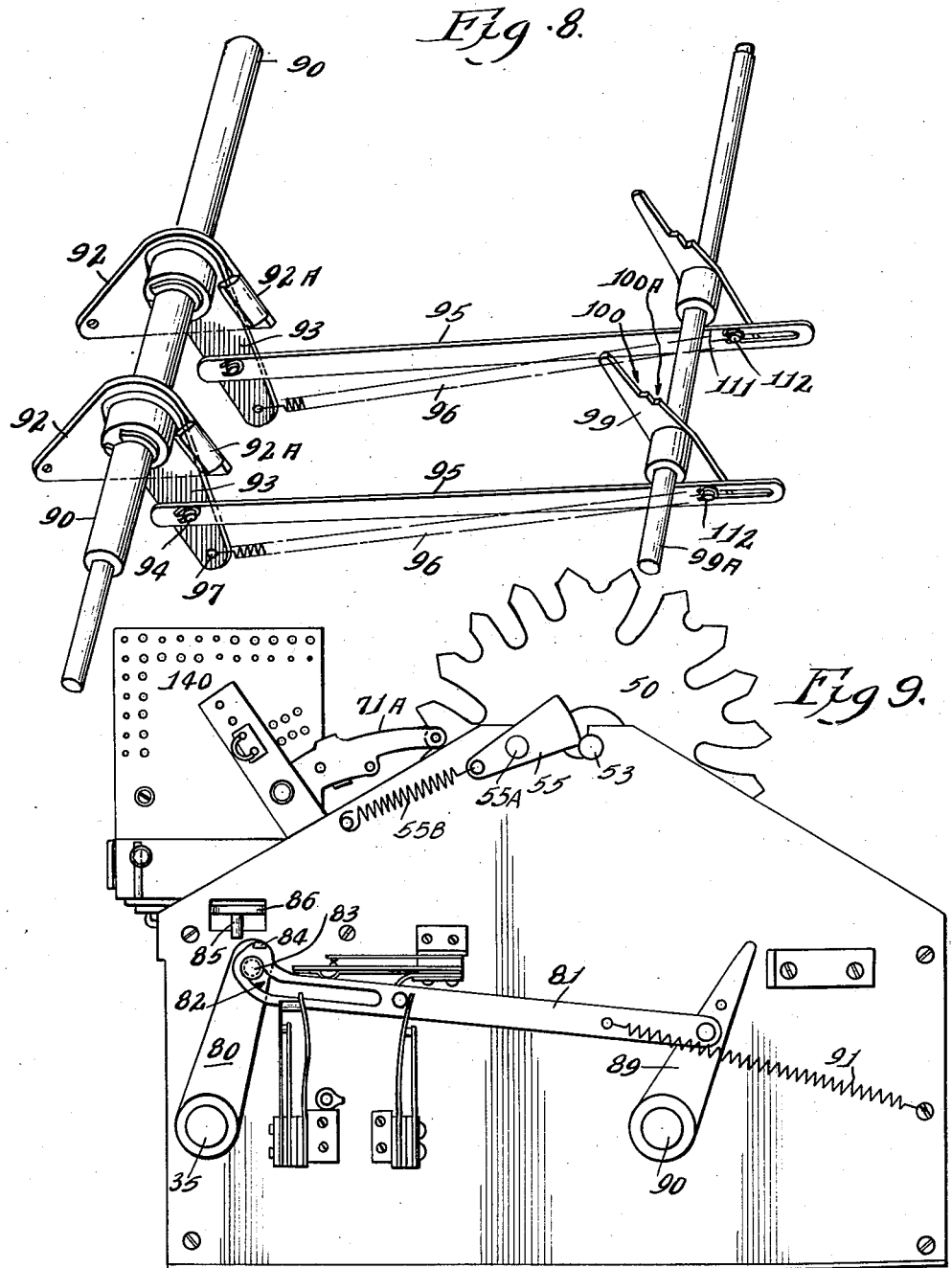
Inventor:
Frank G. Nicolaus
By Allard Livingston
Attorney.

Dec. 18, 1951  F. G. NICOLAUS  2,579,241
PERMUTATION AND COMBINATION MECHANISM
Filed June 27, 1947  8 Sheets-Sheet 8
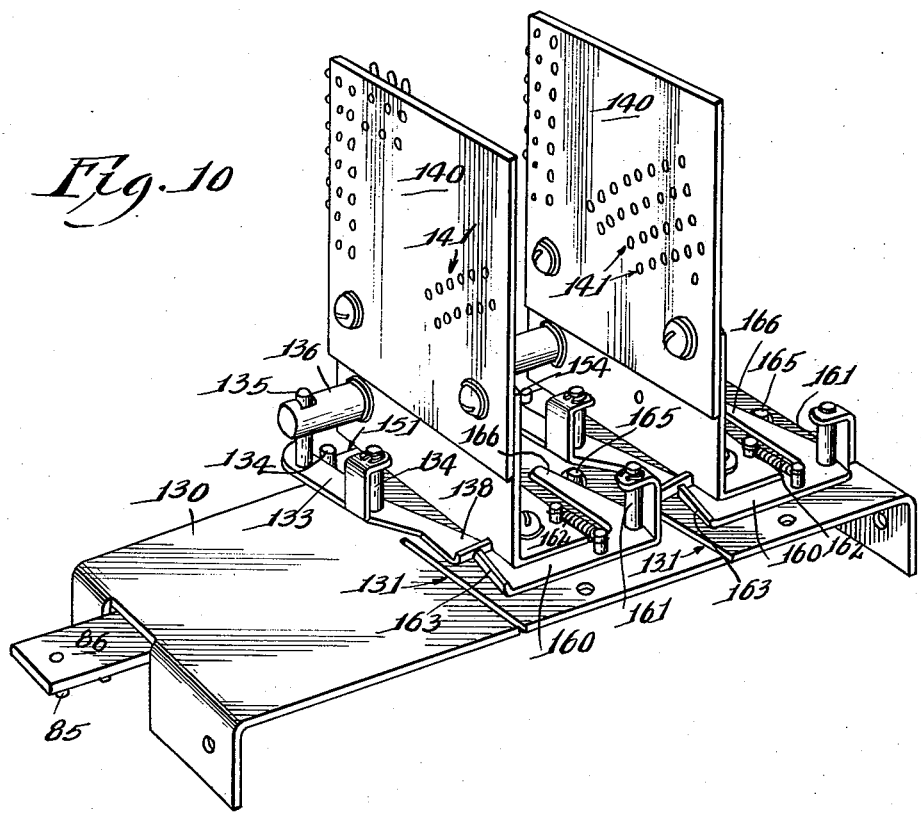
Inventor:
Frank G. Nicolaus
By. Callad Livingston
Attorney.

Patented Dec. 18, 1951

2,579,241

UNITED STATES PATENT OFFICE 2,579,241

PERMUTATION AND COMBINATION MECHANISM

Frank G. Nicolaus, Chicago, Ill., assignor to Raymond T. Moloney

Application June 27, 1947, Serial No. 757,370

31 Claims. (Cl. 74—469)

This invention pertains to permutation and combination mechanisms of a type adapted to spin a selector disc and set up certain control elements or circuits or combinations thereof dependently upon the ultimate selective position assumed by said disc or a number of such discs.

One of the important objects of the invention is the provision of a highly effective, rugged, yet positive and inexpensive mechanical movement for spinning the selector discs or other analogous device, said movement being of general as well as specific application.

Another important object is the provision, in the aforesaid mechanical movement of a novel trip-out driving mechanism for imparting driving power to the device through the agency of a reciprocable lever.

Another object is the provision in such a movement of a novel electro-magnetic master control coacting with a timing-gear train to permit starting or stopping of the mechanism with very little added equipment or addition to the electric power load.

Another object is the provision in such a mechanical movement of a novel and simple trip-out means for triggering the selector means, and also for effecting such triggering in stages so as not to stop the selector discs abruptly and thereby injure or shorten the life of parts.

Another object is the provision of an electro-magnetic holding means for preventing the operation of one or more of several selectors and holding a control circuit previously set up thereby in a subsequent operation of the machine.

Another object is the provision of a simple, releasable, journal means for the selector disc shaft to facilitate servicing or exchange of selector discs.

Another object is the provision of a simple selector switch means.

Additional objects and aspects of novelty and utility peculiar to the invention, relate to details of construction, combination, and operation of the components of the illustrative embodiment described hereinafter in view of the annexed drawings in which:

Fig. 1 is a side elevation of the permutation and combination machine;

Fig. 1–A is a rear, endwise, elevational detail of the electromagnetic master control seen in Fig. 1;

Fig. 8 is a perspective detail of the selector triggering movement or means;

Fig. 9 is a side elevation of the machine opposite from that of Fig. 1;

Fig. 10 is a perspective detail of the selector holding mechanism.

Figure 3:
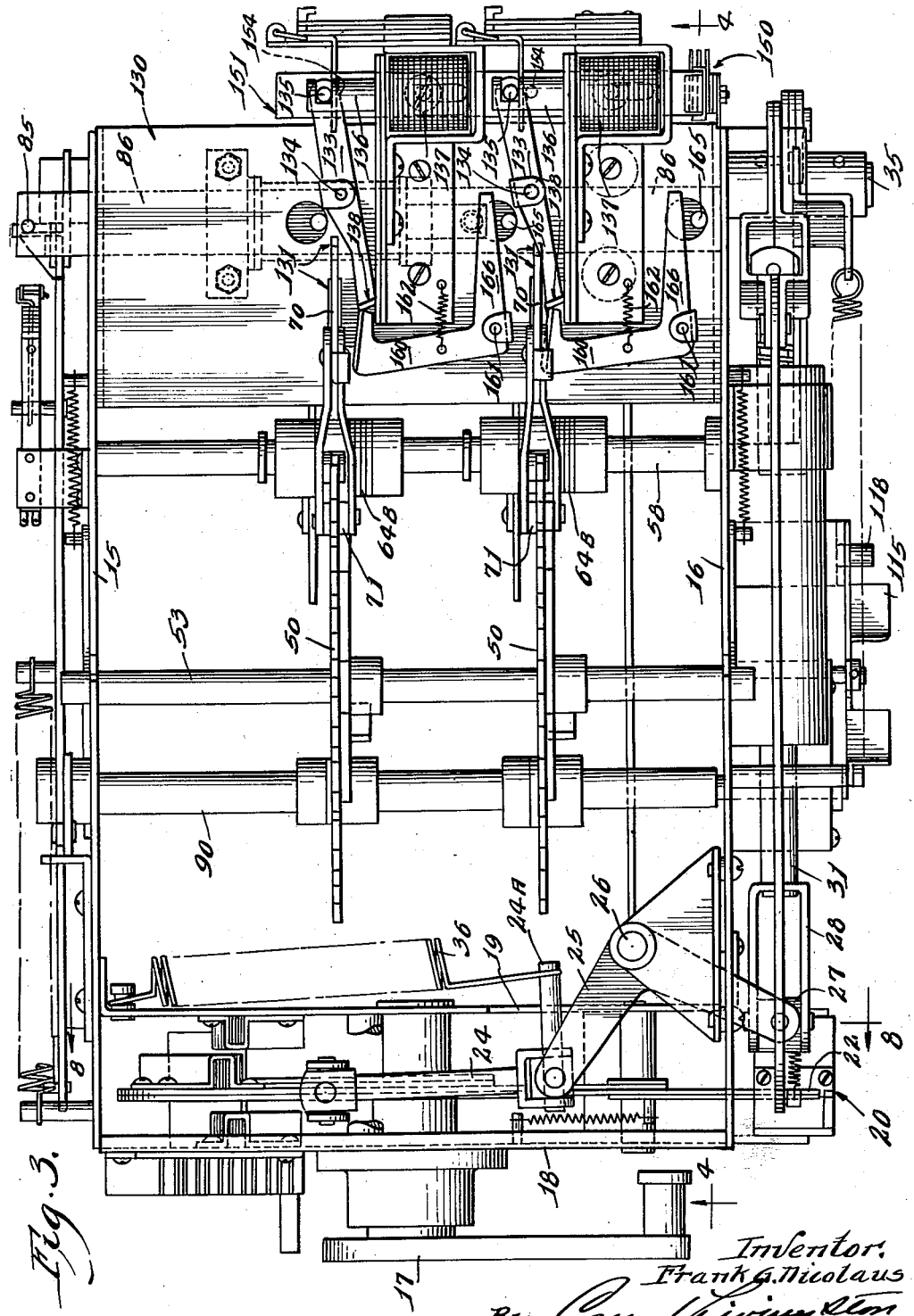
Fig. 3 is a top plan view of the machine.

Referring to the top plan view of Fig. 3, the main frame for the machine consists of the two side walls or plates 15 and 16 joined at the front (left-hand end) by a lever-actuating unit consisting of the hand lever 17 journalled in a pair of parallel plates 18 and 19 extending crosswise of said main frame.

Figure 1:
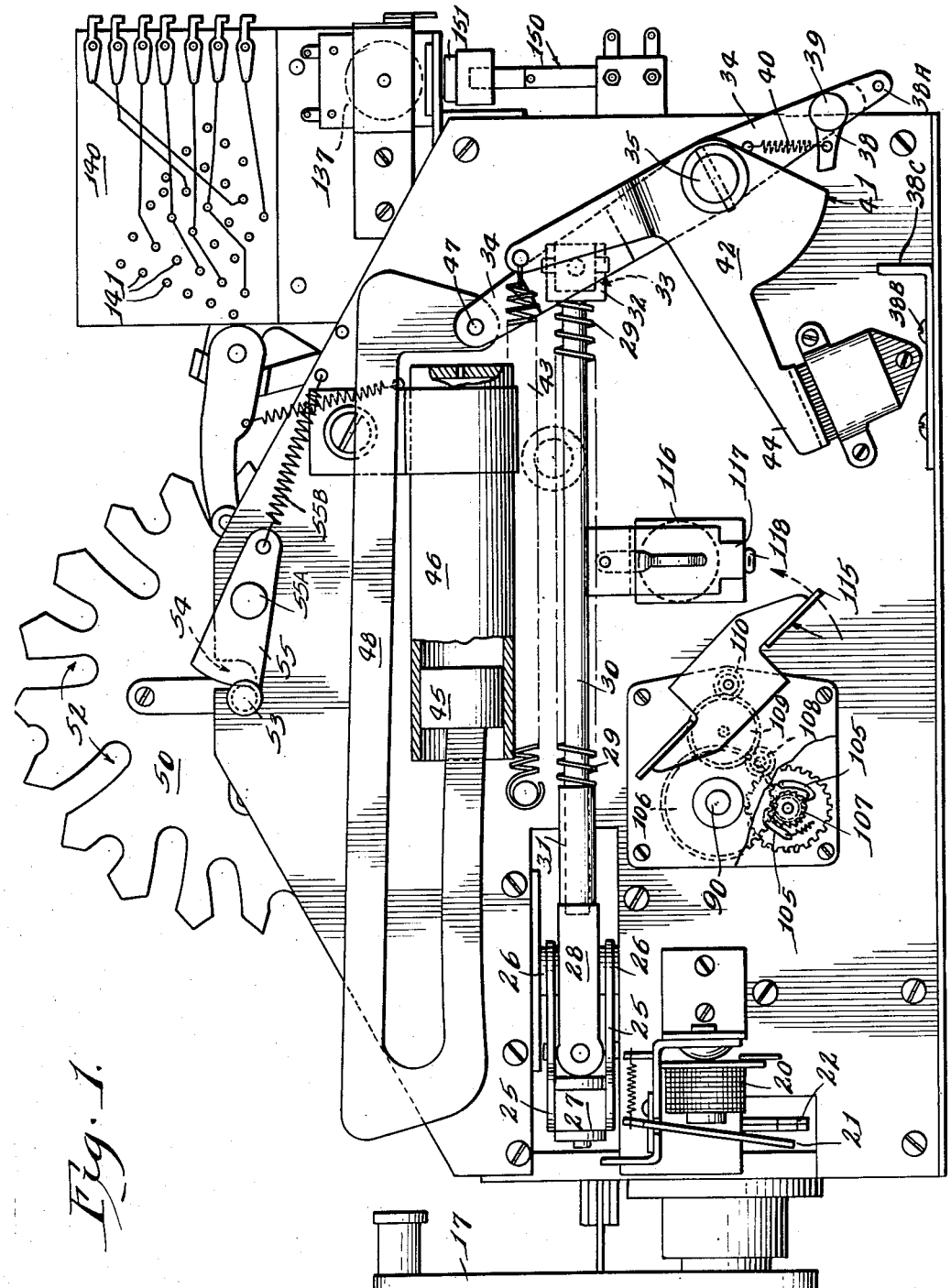

Said lever-actuating mechanism is of the type disclosed and claimed in my copending application Serial No. 757,369, filed of even date herewith, and for present purposes it is sufficient to point out with reference to Fig. 1 that said lever 17 may be depressed provided the electromagnet 20 is energized to attract the armature lock 21 so that it overlies and blocks a pawl 22 associated with said actuating mechanism or unit in order to nullify the effect of certain blocking or locking dog means forming part of said unit.

With the lockout means 20, 21, 22 thus operated and lever 17 depressed, a driving linkage consisting of universal link 24 (Fig. 3) bell crank 25 pivoted at 26 transmits a thrust toward the right through universal joint 27 and yoke 28 to compression spring 29 (Fig. 1) on guide rod 30, the left-hand end of which slides in sleeve 31 of yoke 28 responsive to take-up of the spring.

Figure 2:
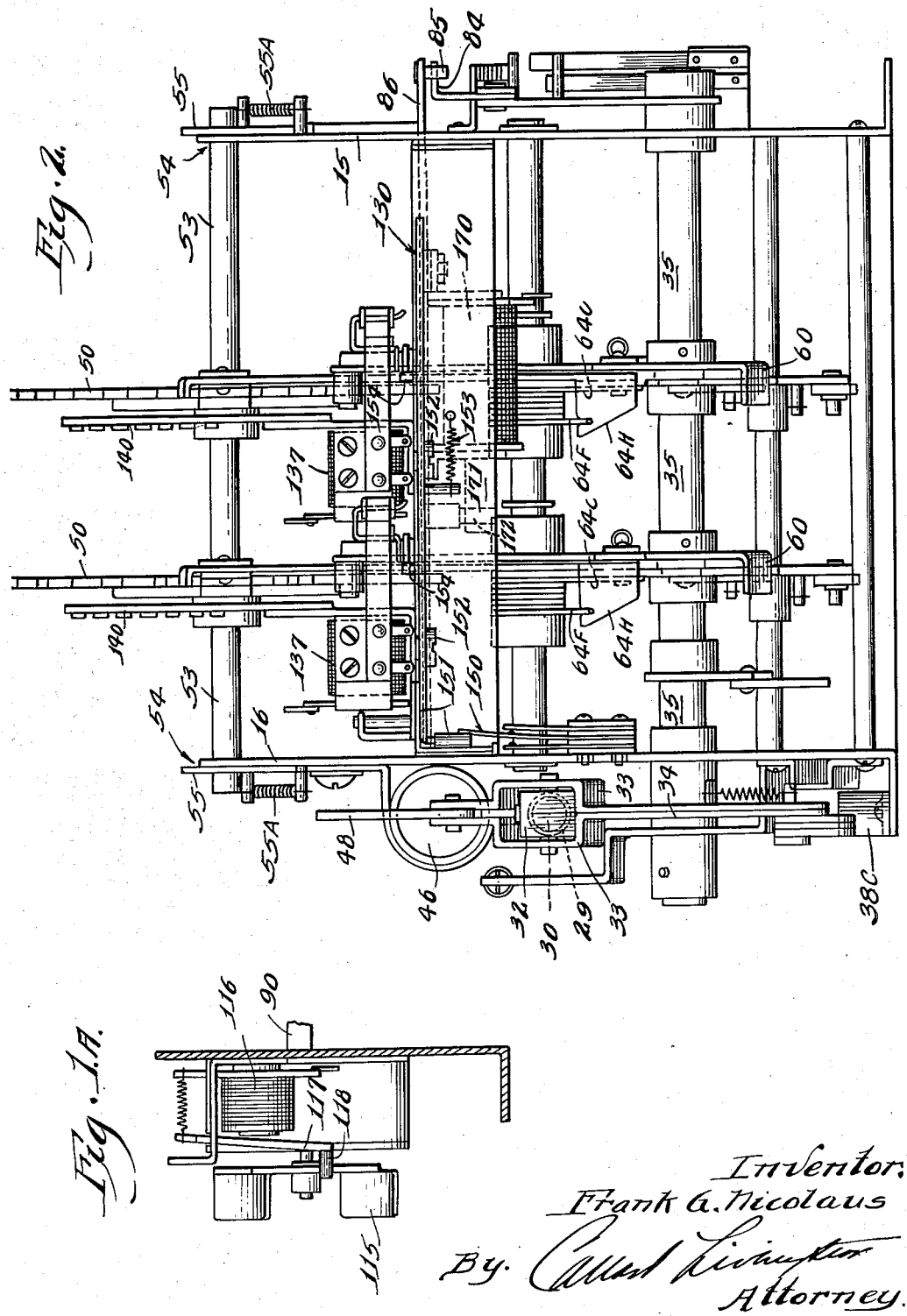
Fig. 2 is a rear elevation of said machine.

As in Fig. 1, the right-hand end of rod 30 connects with universal joint 32, which pivotally connects, as in Fig. 2, with the stamped yokes 33 of drive rocker lever 34 on main cross shaft 35, the right-hand end of spring 29 bearing against said joint 32 to transmit the aforesaid thrust to said rocker lever and urge the latter clockwise, Fig. 1.

Up to the point where lever 34 begins to move substantially, the only counter force is that of the hand-lever return spring 36, Fig. 3, which tends to normalize linkage 24 through connection with pin 24A.

As drive lever 34 rocks clockwise, a movable coupler or coupling dog or lever 38, Fig. 1, pivoted at 39 thereon and normalized by spring 40, engages the coupling cam 41 of trip lever 42 which is fast on main shaft 35, whereas drive lever 34 floats on said main shaft, as a result of which said trip lever 42 likewise begins to move clockwise against the tension of its spring 43 until its shock-absorbing foot 44 is displaced upwardly about 40°, at which time the cam coupling element 38 will trip out from beneath cam portion 41 and trip lever 42 will fly back to normal position, as shown in Fig. 1, a rubber bumper engaged by foot 44 absorbing the shock of this relatively rapid movement under urgence of the return spring 43.

The nature of the actuating mechanism with which the hand lever 17 is associated, as explained in said copending application, is such that the full driving stroke imparted to drive lever 34 must be completed for each operative reciprocation of the hand lever 17, and as a result of this fact and the trip-out function of coupling cam means 38—41—42, the trip lever 42 must be cocked or set to a predetermined position, i. e. clockwise about 40° before it trips into effective driving action. Such tripping is effected by engagement of the tail 38A of the coupling dog with a trip-out lug 38C adjustably secured by screws 38B on the frame.

Movements of the drive lever 34 are regulated by a dashpot plunger 45 in cylinder 46 and connected as at 47 by a form of re-entrant connecting arm 48.

Up to this point, it will appear that, when properly released and operated, manipulation of lever 17 causes a cocking or setting, clockwise, of the main shaft 35 through an impositive trip-out coupling between levers 34 and 42, so that a driving force is set up in the tensioned spring 43 to become effective, as soon as the said coupling cam means 38—41 trips out, to rotate the main shaft 35 anticlockwise, Fig. 1, in a restorative movement.

Figure 4:
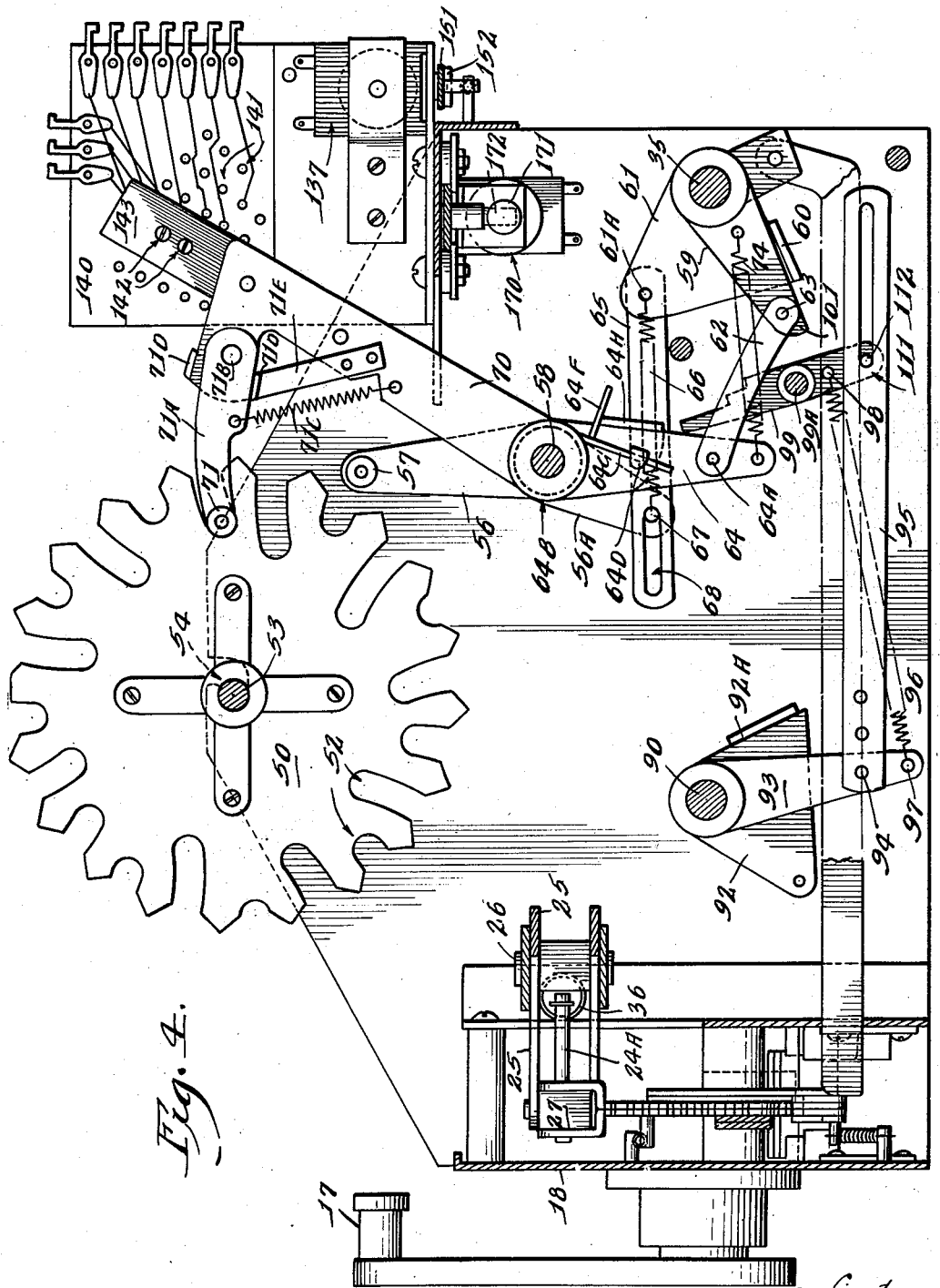
Fig. 4 is a vertical sectional view along lines 4—4 of Fig. 3, with parts, mainly of the selecting and triggering means, shown in elevation and in normal position.
Figure 5:
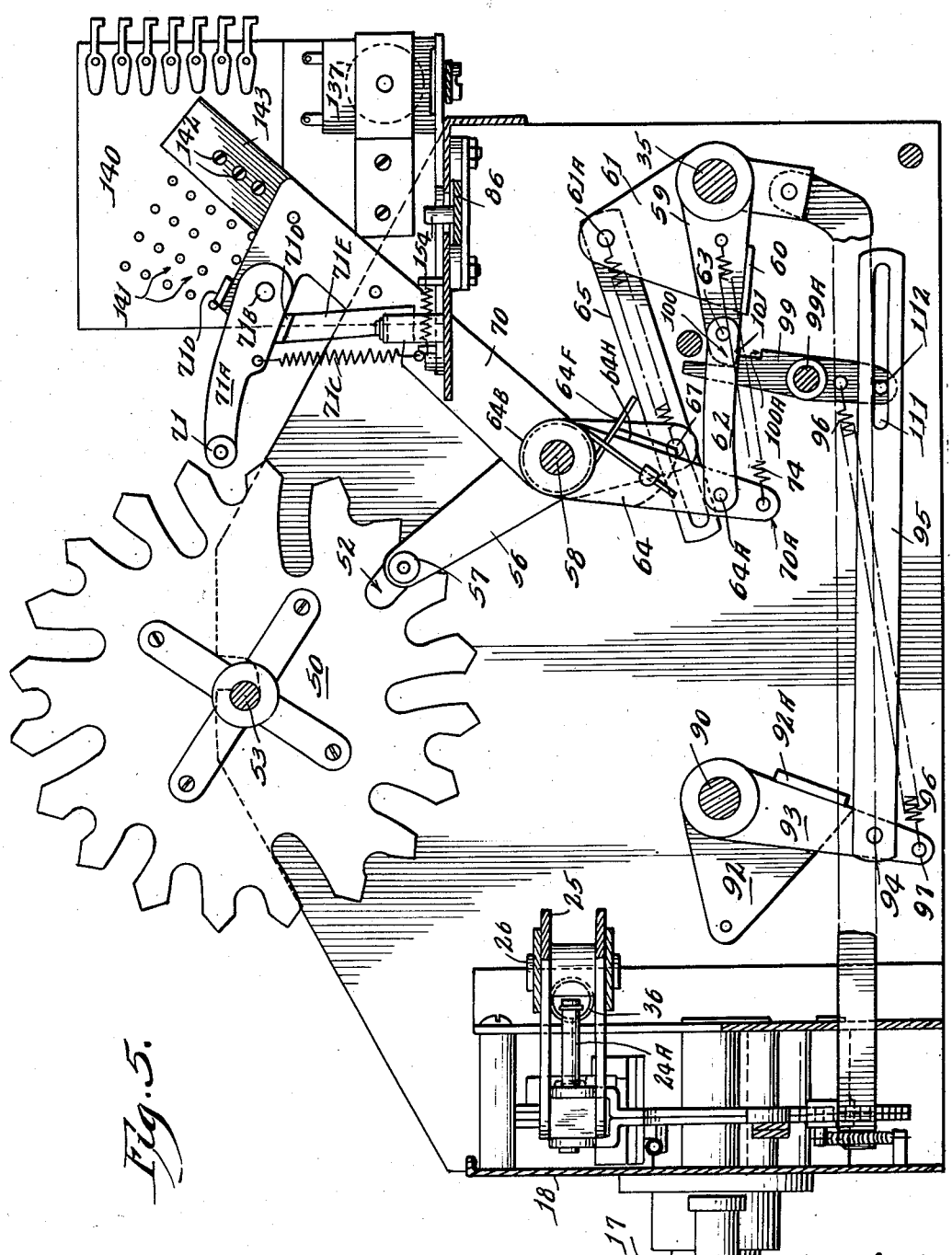
Fig. 5 is a view similar to that of Fig. 4 but showing the parts in triggered condition preparatory to making a selection.

The movements, clockwise, and anticlockwise, imparted as aforesaid to the main shaft 35 are transmitted to the selector disc spinning means and to the selecting mechanism in the particulars now to be described in view of Fig. 4, showing the normal condition, and of Fig. 5, showing the advanced or actuating condition.

Considering first Fig. 4, there are provided a plurality of rotatable selector disc 50, each having radial selecting notches 52 of different radial depth about the peripheries thereof and each freely rotatably on a selector shaft 53 removably journaled in the main frame plates 15 and 16, as in Fig. 1, by being seated in offset slots 54 in said plates with said shaft removably secured in said slots by a locking cam 55, pivoted on the frame plates as at 55A, and normalized by radially acting normalizing springs 55B. By rocking the cams 55 down or anticlockwise, Fig. 1, shaft 53 is freed for removal from the slots 54; and the shaft may be seated by simply dropping it down into the slots and into the offset portion thereof so that cams 55 automatically spring up into locking position.

Means for spinning said selector discs includes for each said disc a spinning pawl 56, Fig. 4 which is kicked or smartly rocked from the advanced or cocked condition of Fig. 5 in a clockwise direction, responsive to the restorative or anticlockwise tripping-out of the main shaft 35, so that the roller 57, advanced into one of the selecting notches 52 from the normal position of Fig. 4 during the aforesaid setting or cocking movement of the main shaft, will throw the selector disc 50 quickly in an anticlockwise direction from the condition of Fig. 5 responsive to tripping out of the main shaft and associated parts, as will be described.

As in Fig. 4, there is associated with each selector disc 50 a compound lever system which serves to spin the selector disc and also to arrest it and set up a selection through the medium of a selecting pawl to be described.

The spinning leverage pawls 56 are part of said compound lever system and are each floating on pawl shaft 58 secured in frame plates 15—16.

When the main shaft 35 is advanced or cocked, clockwise, toggle lever 59 floating thereon is likewise carried therewith by engagement of flange 60 on spinning lever 61, which is fast on shaft 35; as a result, the companion toggle lever 62, pivotally linked by pin 63 to toggle lever 59, moves selector pawl 70 through the medium of an intermediate lever 64, floating on shaft 58, which lever is linked as at 64A to toggle lever 62. The intermediate lever 64 transmits its drive to pawl 70 through a coupling spring 64B on the hub thereof, one end 64C of which spring engages lug 64D on the lever, while the other end 64F of the spring bears against offset lug 64H on the selector pawl 70, and thus the latter pawl is rocked clockwise to withdraw its roller 71 from the notches in the selector disc, as in Fig. 5; and meanwhile clockwise advance of the spinning lever 61 has drawn the spinning arm 65, pivoted thereto at 61A, toward the right and upward, so that a spring 66 (Fig. 7 also) connected to pin 67 on tail 56A of the spinning pawl, pulls the latter to produce anticlockwise rocking into the position shown in Fig. 5 wtih roller 57 in one of the selector notches 52, it being noted that spinning pawl pin 67 works in an elongated slot 68 in arm 65, and at this time, i. e. cocked condition, this pin abuts the right-hand end of the slot nearest the spinning lever 61, with the result that as soon as the main shaft 35 is tripped out, lever 61 makes a sharp anticlockwise movement, thrusting arm 65, and hence pin 67, toward the left abruptly, so that the spinning pawl is rocked sharply in a clockwise direction from the condition of Fig. 5, thereby spinning the selector disc 50 associated therewith.

Figure 6:
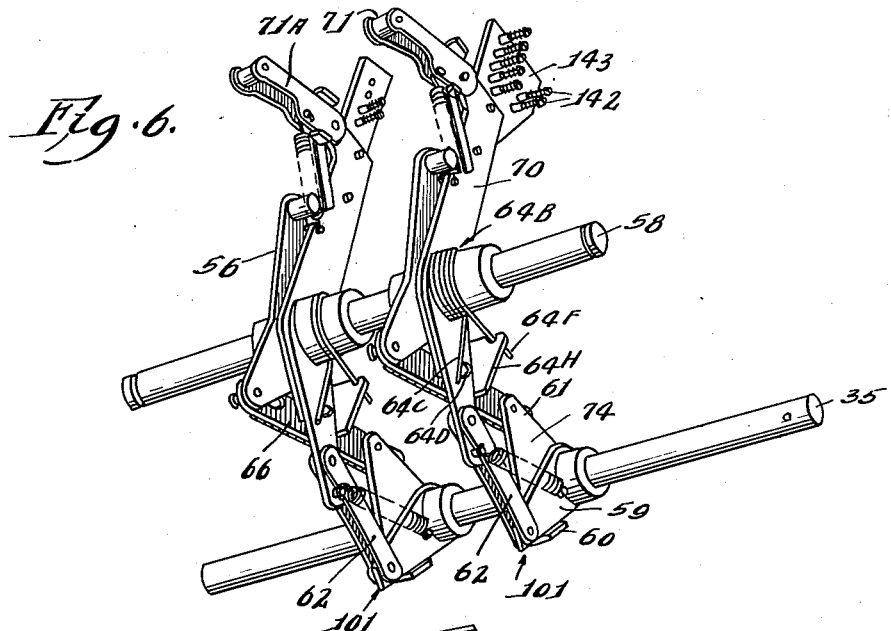
Figs. 6 and 7 are perspective details, front and rear, respectively, of the selector actuating and control parts.
Figure 7:
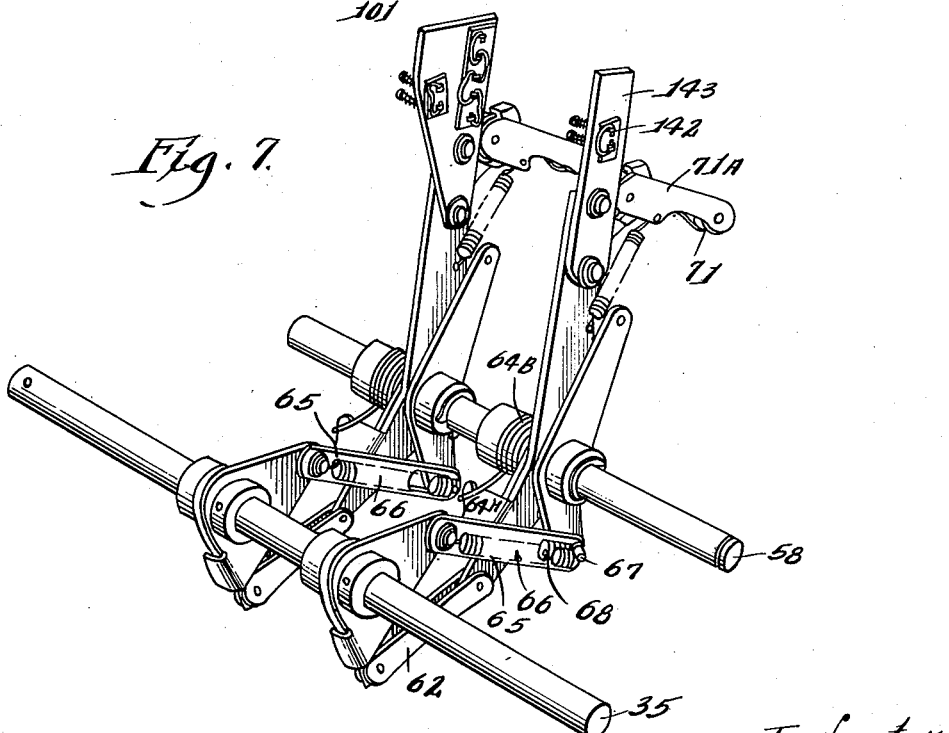

It is emphasized that any number of selector discs and associated compound lever systems may be installed in the machine, two such discs and systems being shown in the illustrative embodiment herein, as viewed in Figs. 2 and 3, said compound lever means or systems being shown to advantage in the perspectives of Figs. 6 and 7.

Recalling that spinning lever 61 is turned toward the right when main shaft 35 is advanced or cocked, and that toggle levers 59 and 62 straighten up to rock the feeler or rockable selector pawl 70, (through intermediate lever means 64, 64B etc.), clockwise into the position shown in Fig. 5, means will now be described for momentarily holding and triggering the selecting pawls into selecting motion.

As the toggle means aforesaid retracts the selector pawl 70, a toggle spring 74, anchored at 70A to the intermediate lever 64 and to a pin on toggle lever 59, becomes tensioned and will ultimately rock the selector pawl toward the left to thrust roller 71 thereof into one of the selecting notches 52.

Referring now to the side elevation of Fig. 9, which views the side of the machine opposite from that of Fig. 1, it will appear that the main shaft 35 in this view rotates anticlockwise when cocked, and lever 80, fast thereon, does likewise, thereby drawing arm 81 toward the left, and also depressing the left-hand extremity of this arm 81 by reason of the angled slot 82 in which pin 83 on lever 80 works, it being here noted for future reference in connection with another aspect of the invention, that such depression of arm 81 causes a cam lug 84 thereon to pass beneath, without engaging, a pin 85 on lateral slide bar 86 for the purpose of releasing or resetting certain holding means hereinafter described upon the return or right-hand stroke of said arm 81.

The aforesaid initial, leftward movement of arm 81 upon cocking of shaft 35, moves lever 89, fast on cross trigger shaft 90, toward the left against the restorative tension of spring 91, so that in the view of Fig. 4, said trigger shaft 90 turns clockwise, thereby carrying abutment lever 92, fast thereon, in the same direction until flange 92A thereon bears against and carries with it, a trigger lever 93, which, through pin connection 94, begins to pull trigger arm 95 toward the left from the position of Fig. 4 toward that of Fig. 5; and at the same time lever 93 is pulling on spring 96 at pin 97, which in turn pulls on a stepped trigger lever 99 at pin 98. Trigger lever or levers 99 float on a cross shaft 99A (see also Fig. 8) and are spring-pulled, as aforesaid, so that the uppermost or first locking notch 100 thereof will move beneath the stop-end 101 (Fig. 4 or 6) of the toggle system to hold the latter in straightened-out or set condition and prevent the selector pawl from advancing into selecting position at once upon spinning of the selector discs.

As a function of the initial, anticlockwise (Figs. 5 and 1) setting of the trigger countershaft 90 of the triggering mechanism, unidirectional clutch pawls 105 (Fig. 1) idle under the driving rotation of shaft 90 through timing gear train 106, 107, 108, 109, 110; but on the trip-out or restorative rocking of shaft 90, the train of timing gears is driven, and by its reduction ratio causes such rocking motion to be relatively slow, so that the trigger arm 95 slowly moves toward the right from the position of Fig. 5 toward that of Fig. 4, until the left-hand extremity of slot 111 in said arm bears against trigger pin 112 at the bottom of the trigger lever, rocking the latter anticlockwise from the holding position of Fig. 5 into the released condition of Fig. 4, thereby freeing the toggle levers to break, so that the toggle springs 74 can rock pawls 70 anticlockwise and thrust the rollers 71 into selecting notches 52 on corresponding selector discs 50, which, up to this time have been spinning freely on shaft 53 by reason of previous operation of pawls 56.

A feature of the trigger means is the provision of a plurality, in this case two, locking notches 100 and 100A, which in conjunction with the relatively slow triggering-out motion of trigger arm 95, under control of timing means 106, etc. causes the toggle system to break only partially upon withdrawal of the first holding or locking notch 100, the holding end 101 of the toggle dropping into the second notch 100A until further advance of arm 95 displaces the trigger lever still farther, with the ultimate result that the selector pawls make only an initial selecting advance into the notches 52 a distance which is calculated to barely engage the tips of the peripheral margins of discs 50, so as to more gently arrest their spinning motion, the pawl rollers 71 being thrust home finally upon removal of the second trigger notches 100A responsive to final motion of arms 95. This feature reduces wear and servicing of parts.

In the compound lever system, the selector pawls 70 are floating and yieldingly linked or coupled to their driving elements. Normally, the toggle springs 74 urge corresponding selector pawls toward the left, Figs. 4 and 5, into selecting position, and the coupling springs 64B between each intermediate lever 64 and its corresponding selector pawl 70 afford additional yielding linkage which permits of any selector pawl being held up in either retracting or advancing movement, the importance of which, in addition to providing smooth operation with minimized wear and stress on the parts, has a bearing on certain holding means to be described hereinafter.

As a further feature of yieldability in the pawl and lever system, each selector pawl has its feeler roller 71 carried on a rocker or finger 71A pivoted at 71B on its corresponding pawl 70 and normally pulled downward by spring 71C, the pivotal movements of this finger being limited by lugs 71D struck up from the offset portion of the main pawl stamping 70.

A reinforcing backer 71E is spotwelded to the pawl with its upper end underlying the lower lug 71D to prevent breaking off of the latter owing to repeated impacts from the spring-urged finger in its selecting movements and disc-arresting functions.

Another control feature is afforded in conjunction with the timer means of Figs. 1 and 1-A, said timer having a governor fan 115 which is driven at relatively high speed and has correspondingly low torque such that only a slight retarding force applied thereto, as for example an obstruction in the path of the governor fan blades, will prevent operation of the timer, and through the gear train will likewise prevent triggering rotation or rocking of trigger shaft 90, which corresponds to the low-ratio side of the gearing.

Electromagnetic master control means for blocking rotation of the governor or fan element includes an electromagnet 116 having an armature 117 with a rubber-jacketed lug 118 thereon and which is normally in the path of blade 115 to block rotation thereof and hence to prevent triggering of the selecting pawls. Energization of electromagnet 116 by any suitable control circuit (not illustrated) will attract armature 117 and withdraw lug 118 from the path of the fan blade so that the selector means or pawls may operate normally.

A further feature of the device is the means for holding any selector in a previous selecting position. To this end, each selector pawl 70 is yieldingly coupled to the toggle system by an intermediate lever 64 on shaft 58 (Figs. 4 and 6), as aforesaid, and this intermediate lever is yieldingly coupled by a spring 64B to its associated toggle system, so that a selector in selecting position, as in Fig. 4, can be held there without interfering with the proper operation of the other units and parts.

The novel holding means is best described in view of Fig. 3, wherein it will appear that a base plate 130 (see also Fig. 2) is mounted crosswise of the upper part of the machine between frame plates 15 and 16; in this plate are slots 131 open to, and aligned with the upper portions of selecting pawls 70, such that the latter may move, toward the right in Fig. 3, well toward the middle of said base plate.

As shown also in Fig. 10, view of Fig. 3, lever means 133, pivoted at 134, is provided for blocking such movement of the pawls, each lever 133 having one of its ends pivotally connected as at 135 to the plunger 136 of an electromagnetic solenoid 137.

By energizing any solenoid 137, its plunger 136 is attracted from the normal position of Fig. 10, with the corresponding blocking end 138 of its blocking lever at one side of slot 131, to shift lever 133 with its blocking end 138 across said slot, with the result that the corresponding selector pawl 70 cannot be fully retracted into the slot, and cannot in fact be withdrawn from selecting engagement with its selecting disc; consequently, the latter cannot be spun upon a subsequent operation of operating lever 17.

Associated with each selecting pawl 70, as in Figs. 5 and 10, particularly, is a contact panel 140 upon which are a multiplicity of arcuately arranged contacts 141 which are engaged by spring contact wipers 142 carried on insulating pieces 143 attached to the upper part of the pawl 70 so as to be swept by the latter across the corresponding bank of contacts responsive to the retracting and advancing motions of the pawls.

Thus, assuming a first operation of the machine in which no holding solenoid 137 were energized, each selector pawl 70 would come to rest as in Fig. 4, with its selecting contacts 142 on certain contacts 141 in its corresponding bank, which contacts being determined by the arcuate travel of the pawl from its starting or fully retracted position, as in Fig. 5, which travel in turn is determined by the depth of the selecting notch 52 into which the feeler roller 71 happens to drop upon arrest of discs 50.

In the event that any holding solenoid is energized, a holding control or supervisory switch 150, Fig. 2 (also Fig. 1) on the back of the machine will be actuated by a shift rod 151 slidable crosswise of the machine on slot screws 152, this rod being normally shifted toward the right in Fig. 2 by spring 153 so that pins 154 on the upper face of this rod will bear against, and pivot, the blocking levers into non-blocking position.

The spring tension of switch 150 also tends to augment the normalizing action of spring 153 in this respect, and in order to hold the blocking levers in blocking position, upon energization of any solenoid 137, latch levers 160, Fig. 10 and Fig. 3, pivoted at 161 are urged by their springs 162 to present their offset ends 163 behind and in the path of the offset ends 138 of the blocking levers so that the latter cannot return to normal non-blocking position once their corresponding solenoids are energized, notwithstanding the effort of normalizing spring 153 of the supervisory-switch operating bar. It will appear that each blocking lever in non-blocking position prevents movement of the corresponding latching lever into latching position.

Means for restoring any or all holding or blocking levers and their associated latching levers to normal condition, includes the lateral slide or restoring bar 86, heretofore mentioned in connection with the triggering mechanism; this bar, as shown best in Fig. 10 is provided with studs 165 which project upwardly through the base plate opposite tails 166 on the latch levers; thus, if the bar 86 be shifted to the left in Fig. 10, or upwardly in Fig. 3, said studs will all bear against said latch tails and pivot the latches so that all holding or blocking levers 133 may return to normal.

Two means are provided for shifting the lateral restoring bar 86; referring to Fig. 9, it will be recalled that every time the machine is operated, the trigger arm 81 moves toward the left and then back toward the right, and on the leftward motion its lug 84 is depressed and passes under the pin 85 on said bar 86, but on the rightward motion, lug 84 engages pin 85 in the general relation shown at the right of Fig. 2, and cams the pin, and hence rod 86 toward the observer in Fig. 9, and to the left in Fig. 10, thereby releasing all of the latch levers 160 as aforesaid.

The second means for actuating the said restoring bar 86 is in the nature of an optional one involving a circuit not shown herein but adapted to energize a solenoid mounted beneath the base plate; this solenoid 170 is seen in full lines in Fig. 4, and in dotted lines in Fig. 2, and it is provided with the usual plunger 171 connecting to a depending pin 172 fixed on bar 86; thus, attraction of said plunger, toward the right in Fig. 2 or away from the observer in Fig. 4, would also shift the lateral restoring bar 86 and cause release of all latch level 160 as aforesaid.

The circuits for controlling the aforesaid restoring solenoid 170, as well as such other master and auxiliary controls as magnets 20 and 116, and the holding solenoids 137 are described and claimed in a copending application Serial No. 600 filed January 5, 1948.

*Summary of operation*

Referring to Fig. 1, if the electromagnet 20 is energized, actuating lever 17 may be depressed, toward the observer, which exerts a thrust toward the right on coupling compression spring 29 through a linkage (Fig. 3) including link 24, bell crank 25, universal joint and yoke 27—28.

Said thrust rocks drive lever 34 clockwise, causing coupling cam 38 to engage cam portion 41 on trip lever 42, so that the latter is likewise rocked clockwise until it has travelled about 40°, at which time the ail 38A of the coupling cam engages the trip-out lug or stop 38C, uncoupling the trip lever so that its spring 43 restores it in an anticlockwise direction with the main shaft 35 moving accordingly. The aforesaid clockwise movement of the lever and shaft amounts to a setting or cocking motion, while the anticlockwise motion amounts to a trip-out driving or operating motion.

As a result of the setting motion of shaft 35 aforesaid, the spinning and selecting pawls are actuated (Fig. 4) in that the spinning lever 61 moves clockwise, causing its lug 60 to bear up on toggle lever 59, moving toggle 62 to rock the intermediate lever 64 clockwise, thereby causing the coupling spring 64B to bear on lug 64H of selector pawl 70 and rock the latter back into the position of Fig. 5, meanwhile setting the trigger 99 in the manner to be described.

At the same time, as spinning lever 61 moves clockwise, arm 65 moves toward the right and spring 66 pulls spinning pawl 56 anticlockwise so that its roller 57 moves into one of the selecting notches 52 in disc 50; but when spinning lever 61 suddenly moves back, anticlockwise, upon tripping out of the main shaft 35, the end of slot 68 bearing against pin 67, Fig. 5, abruptly kicks spinning pawl 56 clockwise, causing selector disc 50 to spin. If there are a plurality of selecting units, all discs 50 will spin at the same time (unless held) since shaft 35 is common thereto.

The triggering means is described in view of Fig. 9, in which shaft 35 first moves anticlockwise upon setting, causing lever 80 to pull lever 89 in the same direction, through arm 81, thereby rocking trigger shaft 90 clockwise as viewed in the transit from the condition of Fig. 4 to that of Fig. 5, a lug 92A of lever 92 on shaft 90 bearing against lever 93 to rock the latter clockwise, thereby setting the trigger arm 95 and pulling spring 96 toward the left, which rocks the trigger 99 clockwise in order that its first notch 100 may move under the top-end 101 of the toggle and hold the latter in set condition while the spinning action goes forward.

When the main shaft 35 trips out as aforesaid and reverses its movement, lever 93 (Fig. 5) likewise reverses and thrusts the trigger arm 95 slowly (owing to the slow governor action of gear train 106 etc.) at 111 against pin 112 thereby rocking the trigger 99 anticlockwise and permitting the toggle to break, partially, while the second trigger notch 100-A catches the toggle, and then fully as the second trigger notch moves out, so that spring 74 may first partially, then fully, thrust the selector pawl into a selecting notch 52, thereby arresting the disc 50 with reduced impact.

Since the radial depths of notches 52 all differ, pawls 70 will assume different angular positions and thereby cause wiper contacts 142 to engage different bank contacts 141, to set up different combinations of circuit connections with various permutations of such connections depending upon the pattern of selecting notches engaged upon each operation of the device.

In order to prevent selecting operation of any selector pawl and hold any previous circuit set up thereby, the corresponding holding solenoid 137 of Figs. 3 and 4 may be energized to cause plunger 136 thereof, Fig. 10, to move to the right and rock the holding or blocking lever 133 across slot 131 so that the corresponding selecting pawl cannot be withdrawn from engagement with its selecting disc into said slot. Since all driving connections and devices are yieldable or impositive, the principal mechanism will operate notwithstanding the holding of one or more of the selecting pawls as aforesaid.

Holding levers 133 are locked in blocking position by latch levers 160 until the machine is operated again or until the solenoid release magnet 170, Fig. 4, is energized; in either case, the reset bar 86, Figs. 2 and 10, is shifted to cause pins 165 thereon to bear against tails 166 of the latch levers and rock the latter out of latching engagement with their holding levers. In Fig. 9, transit of the arm 81 toward the right will cause lug 84 thereon to cam the pin 85 on reset bar 86 to effect such restorative shifting whenever the main shaft 35 goes through its operating cycle; hold-release solenoid 170 may be energized by any desired circuit means, as may also the master control magnets 20 and 116, it being noted that the former controls the main actuating lever system 17—28, while the latter controls only the operation of the selector pawls, it being noted that the spinning pawls trip out in spinning action with tripping out of the main shaft, and hence of levers 61 fast thereon.

The timing gear means does not operate on the setting motion of the main shaft 35 or corresponding motion of trigger shaft 90, owing to unidirectional clutch action of ratchets 105 in the gear train, and hence governor element 115 does not move except upon the restorative or tripped motion of shaft 35.

Thus, the selectors may be controlled as a group by master control magnet 116, or individually by respective holding solenoids 137 and associated holding and latching means.

If the driving thrust on compression coupling spring 29 is too great or sudden, the dashpot means 45, 46, 48 will relieve the load on drive lever 34.

Any suitable means may be employed to impart driving thrust to drive spring 29 and lever 34; in this illustration, a lever actuating mechanism as claimed and described in a copending application has been shown for this purpose.

The objects and advantages of the improved mechanism, including especially the novel tripout means 34—42, 38, etc., the compound lever mechanism 59—61—62—64—65, etc. for pawls 56 and 70; the triggering means 92, 95, 99, 100, 100A, etc.; the holding and release means 133—137, 86, 165—166, etc.; the master holding means 115—116, etc.; and the circuit means 70—142, 141, etc., and associated components, may be altered and modified without departing from the scope of the disclosures originating herein and as embraced by the appended claims, which claims are not intended to be repetitious of the details of the foregoing specification, but rather are intended to point out and particularly claim the aspects and combinations and constructions considered to be the invention herein, as required by the patent statutes.

I claim:

1. Mechanism of the class described including, in combination with a rotatable selector disc, a spinning pawl oscillable to spin said disc, a selector pawl movable to engage selection formations on the disc in arresting the latter, a main shaft adjacent said pawls, means for oscillating said shaft first in setting motion then reversely in tripping motion, a compound lever system driven from said shaft and common to said pawls and including a toggle and spring means set for retracting the selector pawl during setting motion of the main shaft and automatically released for advancing said pawl selectively following tripping motion of said shaft, lever and spring means actuated responsive to tripping motion of said shaft for spinning said disc, a trigger coacting with said main shaft and set thereby during setting thereof to hold said toggle and spring means in set condition, trigger-release means actuated under control of the main shaft during tripping motion thereof to release the said held toggle and effect selecting motion of the selecting pawl, and circuit selecting means actuated by said selector pawl dependently upon selecting displacements thereof determined by said selector disc.

2. Mechanism as defined in claim 1 in which said means for oscillating said main shaft comprises a trip lever fast on said shaft, a drive lever floating on said shaft, a coupling cam on the drive lever engaged with the trip lever to couple said levers for movement together in one direction, spring means for moving said levers in the opposite direction, and trip-out means engaged by said cam during motion in said first direction to uncouple said levers such that the same may be moved by said spring means independently in said opposite direction.

3. Mechanism as defined in claim 1 and further characterized in that said compound lever system is yieldingly coupled to said main shaft and with said pawls for operation as set forth, such that said main shaft may be oscillated in full operative displacement notwithstanding inability of either said pawl to move operatively.

4. Mechanism as defined in claim 3 and further characterized in that there are a plurality of said spinning and selecting pawls each comprising a set and each having a corresponding compound lever systems as described with all said lever systems driven from said main shaft, together with means selectively operable to prevent operative movement of any said selecting pawl in any set.

5. Mechanism as defined in claim 4 and further characterized by the provision of release means actuated from said main shaft responsive to each operative oscillation thereof for releasing any selecting pawl rendered inoperative by said preventing means.

6. Mechanism as defined in claim 4 and further characterized in that said preventing means thereof includes a blocking lever for each selecting pawl, spring means normally holding each blocking lever in non-blocking position, electromagnetic means operable selectively for moving any blocking lever into blocking position, a latch lever for each blocking lever operable automaticaly to releasably lock the latter in blocking position, and release means common to said latching levers for moving the same simultaneously in blocking-lever releasing operation.

7. Mechanism as defined in claim 6 and further characterized in that said common release means includes a cam release bar common to said latching levers, and cam release means actuated by said main shaft responsive to each operative oscillation thereof for shifting said release bar to cause releasing operation of said latch levers.

8. Mechanism as defined in claim 7 and further characterized by the provision of optional release means including a solenoid linked with said cam release bar and energizable to shift the bar in releasing operation independently of said cam release means.

9. Mechanism as defined in claim 1 in which said trigger release means includes a shaft oscillated through linkage with said main shaft, trigger-releasing lever means coacting with said trigger for the purpose set forth, and timing means including a speed-retarding gear train driven unidirectionally by said trigger release shaft whereby the release of said trigger is deferred to permit predetermined spinning of said selector discs.

10. Mechanism as defined in claim 9 in which said gear train includes a rotating governor element moving at higher speed than said trigger release shaft and with proportionately reduced torque such that its rotation may be stopped by a mere block in the path thereof with consequent stoppage of said trigger release shaft rotation, and a master control including an electromagnet having an armature normally blocking said governor element and attractable upon energization thereof to withdraw said armature from blocking position.

11. In a permutation and combination mechanism of the type having a plurality of rotatable selector discs with selecting slots of different radial depth, improvements comprising, namely: a common shaft, a spinning pawl and a selecting pawl for each said disc, said pawls floating on a second shaft, setting and tripping means for moving said common shaft first in one direction and then abruptly in the opposite direction, a compound lever system drivingly interconnecting each set of spinning and selecting pawls with said common shaft, said lever system acting upon setting motion of said common shaft to disengage the selecting pawls from said discs, and upon tripping motion to kick said spinning pawls and effect rotation of said discs, means coacting with said lever system yieldingly urging said selector pawls into selecting engagement with said discs, trigger means actuated cooperatively with said common shaft and lever system to prevent selecting movement by said urging means of said selecting pawls, and trigger tripping means actuated under control of said common shaft during tripping motion thereof for nullifying the preventive action of said trigger means whereby said selecting pawls may move in selecting operation.

12. Mechanism as defined in claim 11 and further characterized in that the driving connection between said common shaft, said compound lever systems, and said pawls associated with each said system, is yieldable, whereby any said pawl may be held inoperative without interference with the operation of the remaining pawls, and means is further provided for selectively blocking operative motion of any said selecting pawl.

13. In permutation and combination mechanism of the type including a plurality of selector discs adapted to be spun, improvements comprising, namely: a spinning pawl for each disc and oscillable to spin its corresponding disc, a main shaft for said pawls, and adjacent thereto a spinning leverage operatively interconnecting said pawls with said shaft and actuated by rocking of said shaft between certain limits, and shaft-rocking means including a drive lever floating on said shaft, a trip lever fast on said shaft, a trippable coupling between said trip and drive levers, means operating responsive to predetermined displacement of said coupled levers in one direction for tripping out said coupling, and means for moving said levers independently in the opposite direction, whereby said main shaft is rocked.

14. Mechanism as defined in claim 13 and further characterized by provision of a compression drive spring for said drive lever and adapted to receive a thrust for moving said lever in said one direction, and a retarding means coupled with said drive lever and acting to limit the force and speed with said lever may be moved in said one direction, said drive spring taking up excess applied driving force of a thrust in excess of a predetermined degree permitted by said retarding means.

15. In a permutation device of the class described including a selector disc, selector means cooperable with said disc, means including a trigger shaft oscillable to effect selecting release of said selector means, improvement comprising, namely, a timing gear train, a unidirectional clutch between said train and trigger shaft, a high-speed, low torque gear in said train, retractable blocking means normally preventing rotation of said gear, and electromagnetic means for selectively retracting said blocking means to permit timing operation of said train and coacting triggering movement of said shaft.

16. In a permutation and combination machine, a main shaft, a trip-out lever fast on said shaft, means yieldingly normalizing said shaft, a drive lever floating on said shaft adjacent said trip-out lever, a dog lever for coupling pivoted on said drive lever and spring normalized for coupling engagement with said trip-out lever responsive to movement of the drive lever from a normal position, means for moving said drive lever into and out of normal position as aforesaid, and a tripping device spaced from said normalized coupling dog lever to be engaged by the latter responsive to predetermined movement of the drive lever from said normal position whereby the coupling dog lever is moved to non-coupling condition.

17. In a permutation and combination machine, a main shaft, a trip-out lever fast on said shaft, a spring urging said trip-out lever into normal position, a drive lever floating on said shaft beside the trip-out lever, a compressible retarder coupled to said drive lever, a compression spring for communicating thrust to said drive lever, means for communicating thrust to said compression spring, a movable coupler on one of said levers and yieldingly normally positioned to couple the same for joint movement, and a trip out lug spaced from the normal position of said levers and engaged by said coupler responsive to movement of the same with said one of the levers a determined amount from normal position to uncouple said levers abruptly and free the trip-out lever and shaft for abrupt restoration to normal conditions by said first-mentioned spring, at least.

18. In a permutation device of the class described, a main shaft, a rockable selecting feeler and shaft mount therefor, an intermediate lever on said shaft mount beside the feeler, the latter and said lever floating on said shaft mount, a spring coupling between said lever and feeler, a toggle drive between said main shaft and intermediate lever and spring-tensioned by angular setting displacement of the main shaft, a trigger cooperable with said toggle drive automatically to hold the latter in tensioned condition, and trigger-tripping means coacting with said main shaft to trip out the trigger as a function of angular displacement of said main shaft.

19. Mechanism as defined in claim 18 and further characterized by the provision of a rockable selector-spinning lever floating on said shaft mount, and rocking means therefor actuated from said main shaft responsive to angular displacement of the latter as aforesaid.

20. Mechanism as defined in claim 19 and further characterized by the provision of means for imparting angular displacement to said main shaft in a setting motion in one direction and abruptly reversing said motion to define each operative cycle of movement of said main shaft.

21. Mechanism as defined in claim 19 and further characterized in that said toggle drive is actuated cooperatively with said rocking means at least in the spring-tensioning of said drive as aforesaid.

22. In a permutation device, a selector disc having radial slots of different depth, a rockable selector arm having a feeler portion projectable into said slots to assume selecting positions dependent upon the depth of slot entered, a wiper contact carried by said arm, a contact bank moved over by said wiper contact and making circuit connections dependent upon the selecting position assumed by said arm, means for spinning said disc, and means for rocking said selector arm away from said disc during initial spinning thereof and moving said arm to stop the disc by projection of said feeler portion into one of said slots and set up a circuit connection as aforesaid.

23. The device defined in claim 22 in which said spinning and rocking means comprises a main shaft, means for rocking said shaft in a first setting direction and for abruptly tripping-out and rocking said shaft in the opposite direction, a spring toggle tensioned during setting of said shaft, a trigger automatically set to hold the tensioned toggle, lever means actuated by rocking of the shaft as aforesaid for engaging a slot portion of said disc to spin the same as a function of said rocking motions of the main shaft in two dirctions as aforesaid, and lever means coacting with said main shaft and acting automatically to trip said trigger as a function of motion of the main shaft in said opposite direction.

24. In a device of the class described, a rotatable selector, a rockable selecting arm having a feeler portion engageable with said selector and moving to different angular selecting positions relative thereto dependently upon the position of angular displacement of said selector, means for rotating the selector, means for rocking said selecting arm away from the selector during initial rotation thereof and for subsequently rocking said arm into selecting engagement therewith, a switch contact carried by said arm, a bank of selecting contacts traversed by said contact for setting up selection circuits dependently upon the selecting positions assumed by said selecting arm.

25. The device defined in claim 24 and further characterized by the provision of yieldable driving connections between said rotating means and said selector, and also between said rocking means and said selecting arm, together with a blocking member for said selecting arm and movable into and out of blocking position relative to the latter such that the selecting arm will prevent rotation of the selector if the same is blocked by said member, and a previous selection circuit may thereby be held notwithstanding actuation of said rotating means.

26. The device defined in claim 24 and further characterized by the provision of a plurality of said selectors each having a corresponding said rotating means and selecting arm with rocking means therefor, a common actuating shaft for all said rotating and rocking means, yieldable driving connections between said shaft and all said rotating and rocking means such that any selector may be held against rotation notwithstanding actuation of said shaft to effect operation of the remaining selectors and selector arms, and electromagnetic means for preventing rotation of any said selector whereby to hold up a previous circuit selection.

27. The device defined in claim 26 and further characterized in that said electromagnetic preventing means includes a blocking lever for each said selecting arm, spring means normally holding each said lever in non-blocking position, a latch acting to lock each said lever in blocking position, electromagnetic means energizable to move any said lever to blocking position, a reset member common to all said latches and movable from a normal position to move said latches simultaneously and effect release of any blocking lever to non-blocking position, and means actuated by said common actuating shaft as a function of each rotating and rocking operation thereof as aforesaid to move said common reset member for the purpose set forth.

28. Mechanism as defined in claim 27 and further characterized by the provision of an optional rest control including an electromagnet and driving connection between the same and said common reset member, said electromagnet being energizable to move the reset member in resetting operation as aforesaid independently of operation of said actuating shaft.

29. A permutation and combination mechanism comprising a plurality of spinnable selector discs, a spinning pawl and a selecting pawl for each said disc and mounted on a common shaft and floating thereon; a main shaft, means for rocking said main shaft in a first direction to set the same and tension a driving spring therefor, a trip-out mechanism acting after predetermined setting motion of the main shaft to release the same abruptly for driving motion in the opposite direction, means including a toggle and trigger actuated from said main shaft for moving the selector pawls out of selecting engagement with corresponding discs during setting motion of said main shaft, means including a spinning leverage actuated from said main shaft during oscillation thereof in setting and driving motion for engaging all spinning pawls with corresponding discs and abruptly disengaging the same in kicking action to spin the discs, trigger-release means actuated from said main shaft during tripped-out drive motion thereof for releasing said toggle trigger whereby to effect selecting engagement of the selecting pawls with spinning discs, circuit control means actuated by said selecting pawls, yieldable coupling between all said pawls and the actuating means connecting the same for operation by the main shaft, as aforesaid, and means for selectively holding any selecting pawl in selecting engagement with the corresponding selector disc during any operative oscillation or rocking of the main shaft as aforesaid.

30. In a permutation and combination device, in combination, a plurality of independently rotatable selecting discs having radial selecting notches of various depths, and means for spinning the discs jointly, a selecting pawl associated with each said disc and pivotable into and out of selecting engagement with notch portions therein into various angular selecting positions determined by the radial depth of the disc notches respectively engaged, linkage means providing a yieldable driving connection for said pawls with said spinning means for pivoting the pawls into and out of selecting engagement with corresponding disc notches as aforesaid responsive to actuation of said spinning means and circuit-selecting contact means operated by said pawls to set up different circuit connections dependently upon the selecting positions assumed by said pawls and determined by the depth of the notches as aforesaid.

31. In a permutation and combination device, in combination, a plurality of independently rotatable selecting discs having radial selecting notches of various depths, and means for spinning the discs jointly, a selecting pawl associated with each said disc and pivotable into and out of selecting engagement with notch portions therein into various angular selecting positions determined by the radial depth of the disc notches respectively engaged, linkage means providing a yieldable driving connection for said pawls with said spinning means for pivoting the pawls into and out of selecting engagement with corresponding disc notches as aforesaid responsive to actuation of said spinning means, and circuit-selecting contact means operated by said pawls to set up different circuit connections dependently upon the selecting positions assumed by said pawls and determined by the depth of the notches as aforesaid, together with means selectively operable to hold any said pawl against selecting movement relative to its corresponding selector disc notwithstanding operation of said spinning means.

FRANK G. NICOLAUS.

REFERENCES CITED

The following references are of record in the file of this patent:

UNITED STATES PATENTS

| Number | Name | Date |
|---|---|---|
| 1,030,568 | Cheney | June 25, 1912 |
| 1,558,393 | Pringle | Oct. 20, 1925 |
| 2,012,544 | O'Neil | Aug. 25, 1935 |
| 2,353,440 | Bresee | July 11, 1944 |